US012811306B2

(12) United States Patent
Chaudhuri et al.

(10) Patent No.: US 12,811,306 B2
(45) Date of Patent: Nov. 24, 2026

(54) GRAPHENE METASURFACE BASED TUNABLE LINEAR TO CIRCULAR POLARIZATION CONVERTER

(71) Applicant: Tata Consultancy Services Limited, Mumbai (IN)

(72) Inventors: Anirban Chaudhuri, Bangalore (IN); Beena Rai, Pune (IN); Parama Pal, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 22 days.

(21) Appl. No.: 18/758,050

(22) Filed: Jun. 28, 2024

(65) Prior Publication Data

US 2025/0007177 A1 Jan. 2, 2025

(51) Int. Cl.
*H01Q 15/24* (2006.01)

(52) U.S. Cl.
CPC .................................. *H01Q 15/244* (2013.01)

(58) Field of Classification Search
CPC .............................. H01Q 15/244; H01Q 15/22
See application file for complete search history.

(56) References Cited

U.S. PATENT DOCUMENTS 2,526,383 A * 10/1950 Meier ..................... H01P 1/067
417/904
3,092,834 A * 6/1963 Mccann ............... H01Q 25/002
343/915

(Continued)

FOREIGN PATENT DOCUMENTS

CN 114759356 A * 7/2022 ............. H01Q 17/00
EP 4485695 A1 * 1/2025 ........... H01Q 15/244

OTHER PUBLICATIONS

Ghosh et al., "Graphene-metasurface-based biosensor for SARS-CoV-2 detection", Mar. 2022, SPIE, Proceedings vol. 12011, High Contrast Meastructures XI; 1201109 (Year: 2022).*

(Continued)

*Primary Examiner* — Dameon E Levi
*Assistant Examiner* — Jordan E. DeWitt
(74) *Attorney, Agent, or Firm* — Finnegan, Henderson, Farabow, Garrett & Dunner, LLP

(57) ABSTRACT

Graphene metasurface based linear to circular polarization converters in THz band plays a crucial role in beyond 5G/THz wireless systems. However, conventional converters suffer a trade-off between "high bandwidth", "compact size" and "high field confinement". The present disclosure provides a graphene metasurface based tunable linear to circular polarization converter to minimize the trade-off by operating at a large bandwidth of 800 GHz with considerable compact size and high field confinement. The linear to circular polarization converter of the present disclosure includes a metasurface comprising two-dimensional periodic array of unit cells along x-axis and y-axis, wherein each unit cell is a three-layered stacked structure with a predefined periodicity. The three-layered stacked structure includes a top layer, a middle layer and a bottom layer. The top layer is a single layer graphene. The middle layer is a dielectric substrate, and the bottom layer comprises thin layer of gold.

5 Claims, 9 Drawing Sheets

(56) References Cited

U.S. PATENT DOCUMENTS

| | | | | |
|---|---|---|---|---|
| 3,119,109 | A * | 1/1964 | Miller | H01Q 15/22 343/912 |
| 11,088,463 | B1 * | 8/2021 | Milroy | H01Q 15/246 |
| 2010/0109960 | A1 * | 5/2010 | Guler | H01Q 15/244 343/756 |
| 2014/0266977 | A1 * | 9/2014 | Redd | H01Q 15/244 343/911 R |
| 2015/0015440 | A1 * | 1/2015 | Montgomery | H01Q 15/248 342/361 |
| 2020/0321378 | A1 * | 10/2020 | Paiella | G02B 5/1828 |
| 2023/0411864 | A1 * | 12/2023 | Chaudhuri | G01N 15/00 |
| 2024/0063550 | A1 * | 2/2024 | Algaba Brazalez | H01Q 15/12 |
| 2025/0007177 | A1 * | 1/2025 | Chaudhuri | H01Q 15/22 |

OTHER PUBLICATIONS

Yadav, Vinit Singh et al., "Graphene-based metasurface for a tunable broadband terahertz cross-polarization converter over a wide angle of incidence", Title of the item: Applied Optics, Date: 2018, vol. 57; Issue: 29, Publisher: Optical Society of America, Link: https://www.researchgate.net/publication/328173915_Graphene-based_metasurface_for_a_tunable_broadband_terahertz_cross-polarization_converter_over_a_wide_angle_of_incidence.

Jiang, Yannan et al., "Broadband linear-to-circular polarization converter based on phosphorene metamaterial", Title of the item: Optical Materials Express, Date: 2019, vol. 9; Issue: 5, Publisher: Optical Society of America, Link: https://opg.optica.org/ome/fulltext.cfm?url=ome-9-5-2088&id=408845.

Zeng, Fang et al., "Tunable mid-infrared dual-band and broadband cross-polarization converters based on U-shaped graphene metamaterials", Title of the item: Optics Express, Date: 2019, vol. 27; Issue: 23, Publisher: Optica Publishing Group, Link: https://opg.optica.org/oe/fulltext.cfm?url=oe-27-23-33826&id=422855.

Sorathiya, Vishal et al., "Graphene-based tunable broadband polarizer for infrared frequency", Date: 2021, Publisher: Research Square, Link: https://assets.researchsquare.com/files/rs-808726/v1_covered.pdf?c=1637079711.

Qiao, Qi et al., "Broadband of linear-to-linear and double-band of linear-to-circular polarization converter based on a graphene sheet with a π-shaped hollow array", Title of the item: Optical Materials Express, Date: 2021, vol. 11; Issue: 9, Publisher: Optical Society of America Link: https://opg.optica.org/ome/fulltext.cfm?url=ome-11-9-2952&id=457129.

Dai, Linlin et al., "Dynamically tunable broadband linear-to-circular polarization converter based on Dirac semimetals", Title of the item: Optical Materials Express, Date: 2018, vol. 8; Issue: 10 Publisher: Optical Society of America, Link: https://opg.optica.org/ome/fulltext.cfm?url=ome-8-10-3238&id=398755.

Zhang, Xinlei et al., "Linear-to-Circular Polarization Converter with Adjustable Bandwidth Realized by the Graphene Transmissive Metasurface", Date: 2021, Publisher: Research Square Link: https://assets.researchsquare.com/files/rs-898044/v1_covered.pdf?c=1643363216.

* cited by examiner

GRAPHENE METASURFACE BASED TUNABLE LINEAR TO CIRCULAR POLARIZATION CONVERTER

PRIORITY CLAIMS

This application claims priority under 35 U.S.C. § 119 from Indian Application No. 202321043765, filed on Jun. 29, 2023. The entire contents of the aforementioned application are incorporated herein by reference.

TECHNICAL FIELD

The disclosure herein generally relates to the field of polarization conversion and, more particularly, to a graphene metasurface based tunable linear to circular polarization converter.

BACKGROUND

Metamaterials and metasurfaces (ultra-thin planar metamaterials) are artificially engineered structures that comprises a two-dimensional array of sub-wavelength periodic unit cells called “meta-atoms”. Unlike natural materials, wave matter interactions in metamaterials and metasurfaces are governed by the geometry, shape and arrangement of metaatoms, instead of their constituent materials. Hence, the amplitude, polarization and phase of EM waves can be manipulated in unconventional ways using metamaterials, achieving unique phenomenon like electromagnetic cloaking, negative refraction, sub-diffraction imaging etc. In recent times, metasurfaces have attracted significant research interest in a variety of applications due to their small and planar structure, light weight and strong electric and magnetic responses in Terahertz frequencies particularly for non-destructive, label-free sensing and terahertz wireless communication. One drawback that limits the large scale adoption of metasurfaces is the fact that their functionalities or frequency response cannot be altered post-fabrication, making them inefficient. Recently, a new class of metasurfaces, called programmable or active metasurface has been introduced, which can be dynamically tuned using external control signals post fabrication. Among them, graphene based metasurfaces have emerged as one of the most promising candidate.

Graphene is a two-dimensional nanomaterial having a thickness of single carbon atom. Due to their extraordinary optical and electronic characteristics like high carrier concentrations, very high spatial mobility of carriers and remarkable mechanical properties, graphene-based metasurfaces have attracted significant research interest for numerous applications. Further, EM response of graphene-based metasurfaces can also be dynamically tuned via electrical tuning and chemical doping techniques. Graphene metasurfaces have been widely explored to realize different types of polarization converters like broadband and narrow-band cross-polarization converters, multi-band and broadband linear-to-circular polarization converters. Tunable metasurface based polarization converters in THz band are expected to play a crucial role as Reconfigurable Intelligent Surfaces (RIS) in beyond 5G/THz wireless systems. However, considering the requirements of a practical wireless system like high bandwidth, compact size and high field confinement, existing graphene metasurface based linear to circular polarization converters suffers a trade-off between these parameters. Hence there is a challenge in building a graphene metasurface based linear to circular polarization converter by minimizing the trade-off between the said parameters.

SUMMARY

Embodiments of the present disclosure present technological improvements as solutions to one or more of the above-mentioned technical problems recognized by the inventors in conventional systems. For example, in one embodiment, a graphene metasurface based tunable linear to circular polarization converter is provided. The graphene metasurface based tunable linear to circular polarization converter includes a metasurface comprising two dimensional periodic array of a plurality of unit cells along x-axis and y-axis, wherein each of the plurality of unit cells is a three layered stacked structure with a predefined periodicity, wherein the three layered stacked structure comprises a top layer, a middle layer and a bottom layer, wherein the top layer is a single layer graphene sheet with a phi(ϕ) shaped slot etched at a predefined angle to both x-axis and y-axis to divide the single layer graphene sheet into two regions with a predefined geometrical dimensions. The middle layer is a dielectric substrate. The bottom layer comprises thin layer of gold to prevent any electromagnetic (EM) wave transmission. A linear-to-circular polarization conversion is performed by reflecting back a linearly polarized EM wave incident on the metasurface along a corresponding co-polar and cross-polar components with a predefined phase difference and a predefined axial ratio over a wide frequency range. The linear-to-circular polarization is independent of a polarization state of the incident EM wave. Response of the metasurface is tunable post fabrication, wherein tuning of the response is performed by changing chemical potential of the metasurface using one of an external voltage and current.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
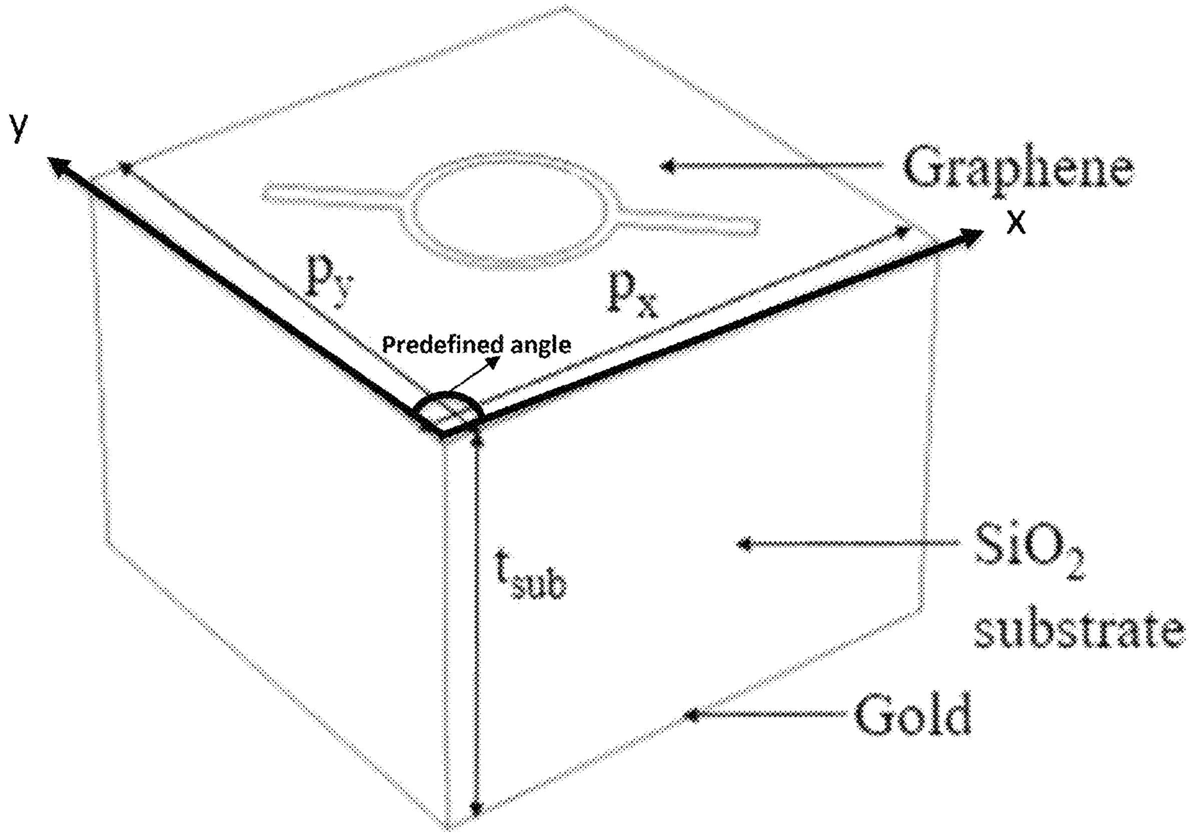
FIG. 1 illustrates a 3-dimensional view of a graphene based metasurface unit cell, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

In recent times, metasurfaces have attracted significant research interest in a variety of applications in the terahertz (THz) band (0.1 THz to 10 THz) due to their small and planar structure, light weight and strong electric and magnetic responses in these frequencies particularly for non-destructive, label-free sensing and terahertz wireless communication. One drawback that limits the large scale adoption of metasurfaces is the fact that their functionalities or frequency response cannot be altered post-fabrication, making them inefficient. Recently, a new class of metasurfaces, called programmable or active metasurface has been introduced which can be dynamically tuned using external control signals post fabrication. Among them, graphene based metasurfaces have emerged as one of the most promising candidate.

Graphene is a two-dimensional nanomaterial having a thickness of single carbon atom. Due to their extraordinary optical and electronic characteristics, high carrier concentrations, very high spatial mobility of carriers and remarkable mechanical properties, graphene-based metasurfaces have attracted significant research interest for numerous THz applications. Their EM response can also be dynamically tuned via electrical tuning and chemical doping techniques. Graphene metasurfaces have been widely explored to realize different types of polarization converters like broadband and narrow-band cross-polarization converters, multi-band and broadband linear-to-circular polarization converters. Tunable metasurface based polarization converters in THz band are expected to play a crucial role as Reconfigurable Intelligent Surfaces (RIS) in beyond 5G/THz wireless systems. However, considering the requirements of a practical wireless system-high bandwidth, compact size and high field confinement, existing graphene metasurface based linear to circular polarization converters suffers a trade-off between these parameters.

To overcome the challenges of the conventional approaches, embodiments herein provide a graphene metasurface based tunable linear to circular polarization converter to minimize the trade-off by operating at a large bandwidth of 800 GHz with considerable compact size and high field confinement.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 illustrates a 3-dimensional view of a graphene based metasurface unit cell, in accordance with some embodiments of the present disclosure. Now referring to FIG. 2(A), the graphene based metasurface includes a two-dimensional periodic array of a plurality of unit cells along both x-axis and y-axis. Referring to FIG. 1, Each of the plurality of unit cells is a three-layered stacked structure with a predefined periodicity (for example, $P=P_x=P_y=22$ μm). The top layer iSncludes a single layer of graphene sheet with a phi(ϕ) shaped slot etched at a predefined angle (for example) 45° with respect to both x- and y-axis thus separating the graphene sheet into two regions (for example, $\psi_1$ and $\psi_2$) having predefined geometrical dimensions. For example, the dimensions are $r_1=4$ μm, $r_1=3.5$ μm, $l_1=18$ μm and $l_1=1$ μm. For simulations, the thickness of graphene sheet is typically taken as 1 nm. The surface conductivity of graphene is expressed mathematically by using the Kubo formula as shown in equation 1. Now referring to equation 1, the first term in conductivity equation is attributed to the intraband electron transitions and the second term to the interband transitions. These two terms can be re-written separately as shown in equation 2 and 3 respectively:

$$\sigma(\omega, \mu, \tau, T) = \frac{je^2(\omega - j2\tau)}{\hbar^2\pi} X \left[\frac{1}{(\omega - j2\tau)^2}\int_0^\infty \varepsilon\left(\frac{\partial f_d(\in)}{\partial \in} - \frac{\partial f_d(-\in)}{\partial \in}\right)d\epsilon - \int_0^\infty \frac{f_d(-\epsilon) - f_d(\epsilon)}{(\omega - j2\tau)^2 - 4(\epsilon/\hbar)^2}d\epsilon\right] \quad (1)$$

$$\sigma_{intra}(\omega, \mu, \tau, T) = \frac{-je^2kB^T}{\hbar^2\pi(\omega - j2\tau)}\left(\frac{\mu}{kB^T} + 2\ln\left(e^{\left(\frac{-\mu}{k_BT}\right)} + 1\right)\right) \quad (2)$$

By approximating $k_BT<<|u|$, $\hbar\omega$; the interband conductivity can be represented as $$\sigma_{intra}(\omega, \mu, \tau, 0) \approx \frac{-je^2}{4\pi\hbar^2}\ln\left(\frac{2|\mu| - (\omega - i2\tau)\hbar}{2|\mu| + (\omega + i2\tau)\hbar}\right) \quad (3)$$

Here, e is the electronic charge, w is the angular frequency of the EM wave, τ is the electron relaxation time and taken as 1 ps; T is 300K and $$\hbar = \frac{h}{2\pi} f_d(\in) = \frac{1}{1 + e^{\left(\frac{e-\mu}{k_BT}\right)}}$$

is the Fermi-Dirac distribution of the energy state; μ is the chemical potential and is varied from 0.5 eV to 0.8 eV. The middle layer is a dielectric $SiO_2$ substrate, having a dielectric constant of $\epsilon SIO_2=3.9$ and thickness $t_{sub}=15$ μm. The bottom layer is completely covered with 1 μm thick layer of gold having conductivity $\sigma=4.56\times10^7$S/m to prevent any EM wave transmission.

A linearly polarized wave incident on the metasurface is reflected back along both x and y directions-co-polar and cross-polar components respectively, with a phase difference of approx. ∓90. An 3 dB is maintained over a wide frequency range, thus giving a linear-to-circular polarization conversion. The formula for AR is given in equation 4. Owing to the symmetry and orientation of this structure, the linear-to-circular polarization conversion is independent of the polarization state of the incident EM wave. Moreover, owing to the dependence of the spectral response on the chemical potential of graphene, the metasurface's response can be tuned post fabrication, by tuning its chemical potential using an external voltage or current, thus achieving programmability.

$$AR = 10 * \left|\log\left(\frac{|R_{xx}|}{|R_{yx}|}\right)\right| \quad (4)$$

Figure 2:
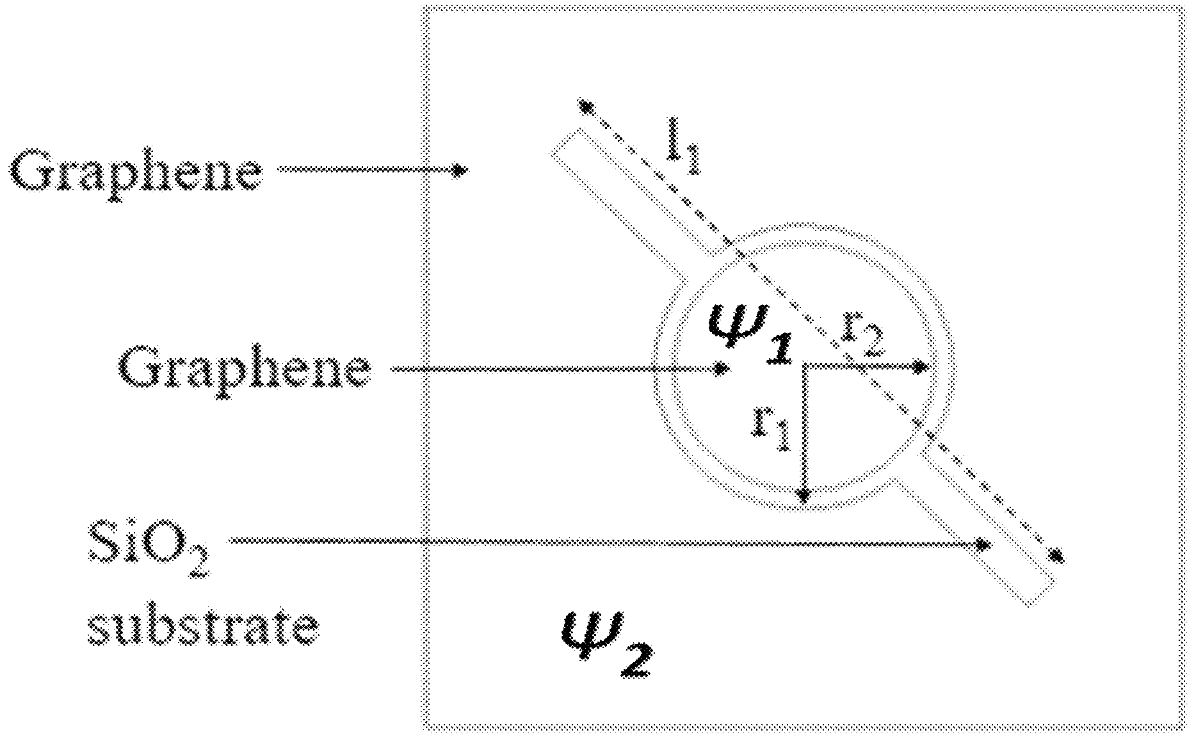
FIG. 2 illustrates top view of the graphene based metasurface unit cell, in accordance with some embodiments of the present disclosure.
Figure 2A:
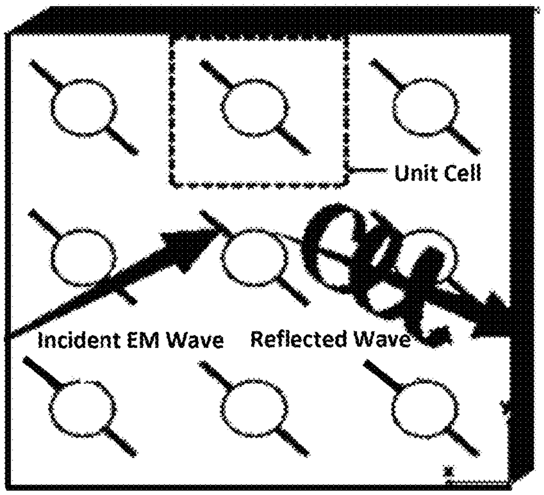
FIG. 2(A) illustrates perspective view of the graphene based metasurface polarization converter, in accordance with some embodiments of the present disclosure.

FIG. 2 illustrates top view of the graphene based metasurface unit cell, in accordance with some embodiments of the present disclosure. It gives a schematic of the graphene sheet and the phi(ϕ) shaped slot etched in it, as well as its orientation and the geometrical dimensions $r_1$, $r_2$ and $l_1$, wherein $r_1$ and $r_2$ indicate radius and $l_1$ indicates length.

Figure 3:
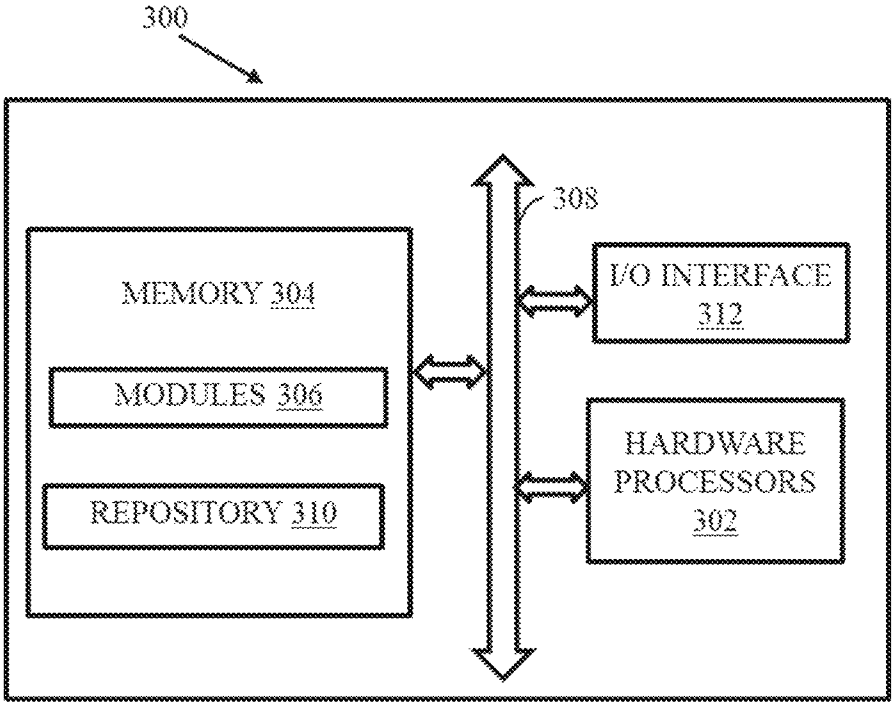
FIG. 3 is a functional block diagram of a system for simulating functionalities of graphene metasurface based tunable linear to circular polarization converter, in accordance with some embodiments of the present disclosure.

FIG. 3 is a functional block diagram of a system for simulating functionalities of graphene metasurface based tunable linear to circular polarization converter, in accordance with some embodiments of the present disclosure. The system 300 executes simulation steps to analyze the functionalities (FIGS. 4, 5 and 7) of the present disclosure. Further, the system 300 is used for realizing/generating an equivalent circuit model (FIG. 6) for the graphene metasurface.

The system 300 includes or is otherwise in communication with hardware processors 302, at least one memory such as a memory 304, an I/O interface 312. The hardware processors 302, memory 304, and the Input/Output (I/O) interface 312 may be coupled by a system bus such as a system bus 308 or a similar mechanism. In an embodiment, the hardware processors 302 can be one or more hardware processors.

The I/O interface 312 may include a variety of software and hardware interfaces, for example, a web interface, a graphical user interface, and the like. The I/O interface 312 may include a variety of software and hardware interfaces, for example, interfaces for peripheral device(s), such as a keyboard, a mouse, an external memory, a printer and the like. Further, the I/O interface 312 may enable the system 400 to communicate with other devices, such as web servers, and external databases.

The I/O interface 312 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 312 may include one or more ports for connecting several computing systems with one another or to another server computer. The I/O interface 312 may include one or more ports for connecting several devices to one another or to another server.

The one or more hardware processors 302 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 302 is configured to fetch and execute computer-readable instructions stored in the memory 304.

The memory 304 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 304 includes a plurality of modules 306. The memory 304 also includes a data repository (or repository) 310 for storing data processed, received, and generated by the plurality of modules 306.

The plurality of modules 306 include programs or coded instructions that supplement applications or functions performed by the system 300 for graphene metasurface based tunable linear to circular polarization converter. The plurality of modules 306, amongst other things, can include routines, programs, objects, components, and data structures, which performs particular tasks or implement particular abstract data types. The plurality of modules 306 may also be used as, signal processor(s), node machine(s), logic circuitries, and/or any other device or component that manipulates signals based on operational instructions. Further, the plurality of modules 306 can be used by hardware, by computer-readable instructions executed by the one or more hardware processors 302, or by a combination thereof. The plurality of modules 306 can include various sub-modules (not shown).

The data repository (or repository) 310 may include a plurality of abstracted piece of code for refinement and data that is processed, received, or generated as a result of the execution of the plurality of modules in the module(s) 306.

Although the data repository 310 is shown internal to the system 300, it will be noted that, in alternate embodiments, the data repository 310 can also be implemented external to the system 300, where the data repository 310 may be stored within a database (repository 310) communicatively coupled to the system 300. The data contained within such an external database may be periodically updated. For example, new data may be added into the database (not shown in FIG. 3) and/or existing data may be modified and/or non-useful data may be deleted from the database. In one example, the data may be stored in an external system, such as a Lightweight Directory Access Protocol (LDAP) directory and a Relational Database Management System (RDBMS).

Figure 4A:
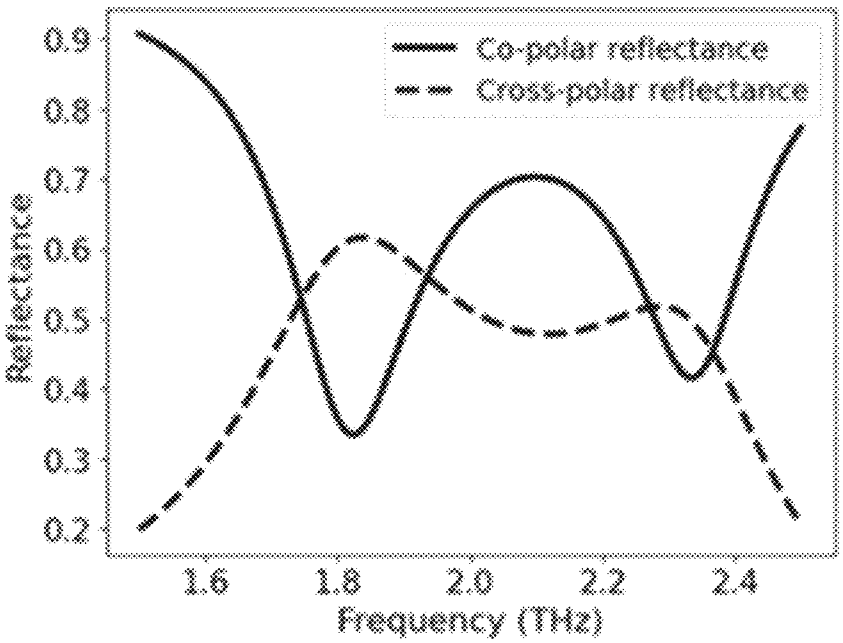
FIG. 4 (FIG. 4A through FIG. 4D) illustrates various plots for evaluating graphene metasurface based tunable linear to circular polarization converter of FIG. 1 according to some embodiments of the present disclosure.
Figure 4B:
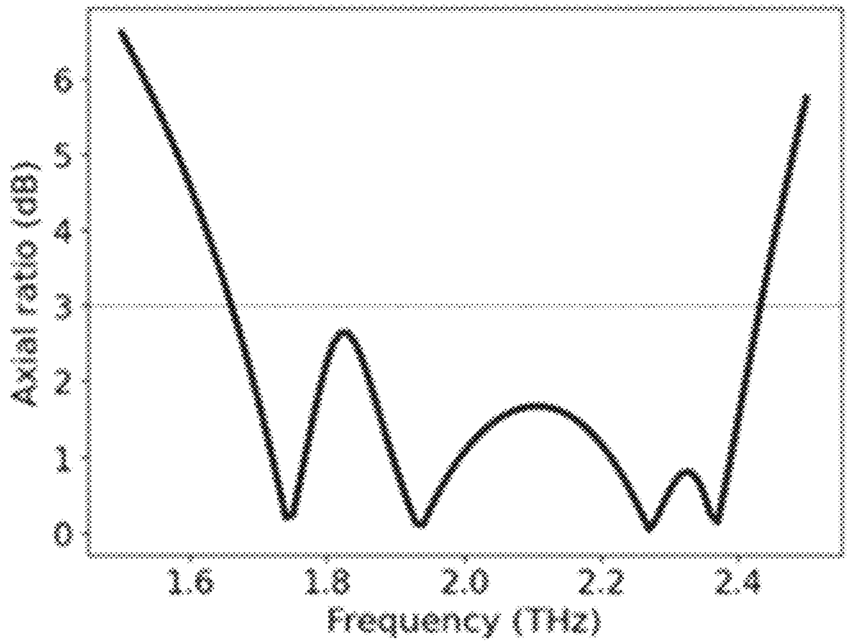
Figure 4C:
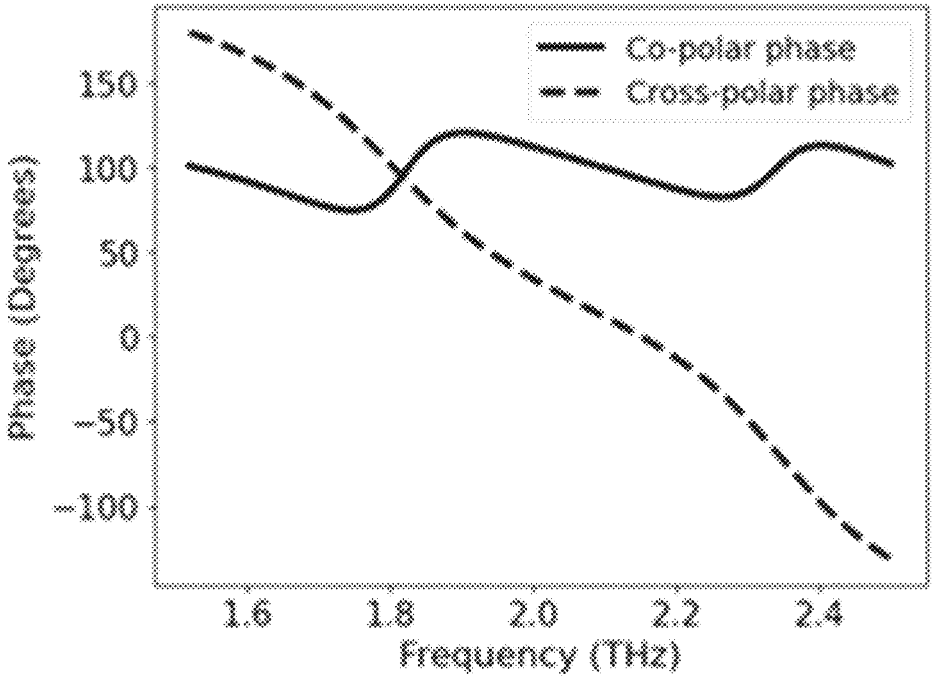
Figure 4D:
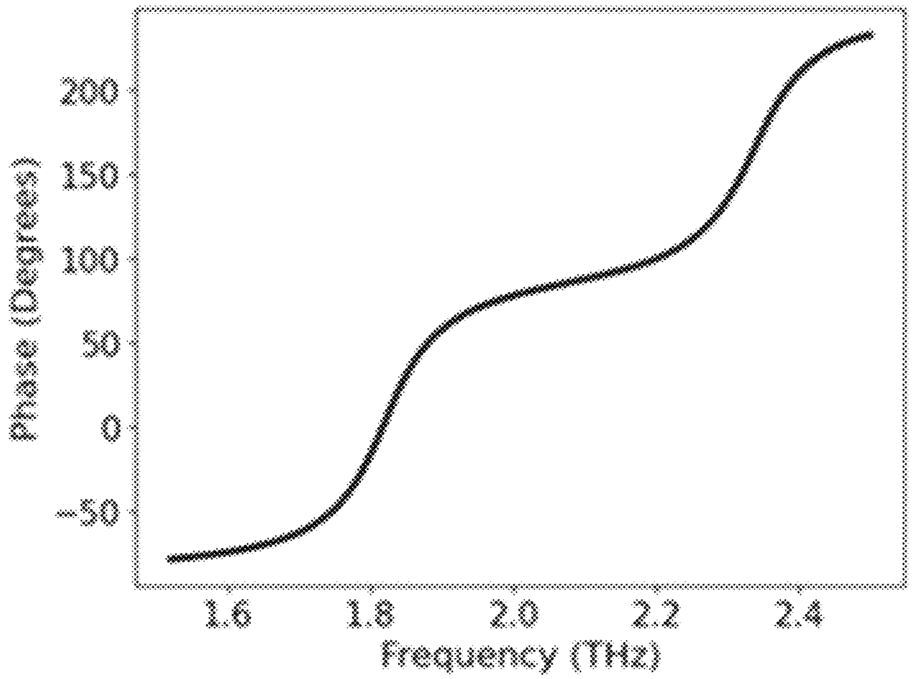

In an embodiment, the metasurface structure of the present disclosure is simulated using system 300 using one or more simulation techniques as follows: The metasurface structure of FIG. 1 is studied in frequency domain via finite element method (FEM). To reduce the computation time, only a single unit cell is simulated with periodic boundary conditions applied along the x- and y-axis side boundaries. The periodic boundary condition approximates an infinite array of unit cells along both these directions. For wave excitation, a plane x-polarized EM wave with normal incidence is used. Transition boundary condition is applied to the graphene sheet and simulated with thickness and conductivity values as illustrated in FIG. 4. FIG. 4A illustrates magnitude plot of co-polar reflectance ($R_{xx}$) and cross-polar reflectance ($R_{yx}$) for chemical potential, μ=0.7 eV. FIG. 4B illustrates Axial ratio for chemical potential, μ=0.7 eV. FIG. 4C illustrates Phase plot of co-polar reflectance and cross-polar reflectance for chemical potential, μ=0.7 eV and FIG. 4D illustrates Phase difference between co-polar and cross-polar reflectance for chemical potential, μ=0.7 eV.

The extent of circular polarization is quantitatively measured by AR, which is the ratio of major and minor axis components, given by equation 4. Axial ratio is calculated using equation 4 and is plotted in FIG. 4B. Practically, an AR of 3 dB and below signifies a good circularly polarized EM wave. From FIG. 4B, it was observed that AR<3 dB has been achieved over a bandwidth of 800 GHz, ranging from 1.65 THz to 2.45 THz. Also, it can be seen from FIG. 4D that in a majority of points in this frequency region, the phase difference between $R_{xx}$ and $R_{yx}$ is ∓90°. The compactness of this structure can be quantified by its lattice size(p) and thickness ($t_{sub}$), which is equal to λ/7 and λ/10 respectively, where λ is the wavelength corresponding to the central operating frequency.

Over the operating frequency band, the incident EM field induces a current on the top graphene sheet as well as at the bottom gold layer in anti-parallel directions which creates a magnetic resonance. The induced circular current generates a magnetic field ($H_{induced}$) having components along both the x and y direction. Considering an x-polarized incident EM wave ($E_{xi}$), the x component of $H_{induced}$ aligns with $E_{xi}$, generating a cross-polarized component along y-axis. The phase difference between $R_{xx}$ and $R_{yx}$ depends on the interference of the multiple reflected waves from the top and bottom layer and is adjusted by varying the geometrical parameters and $SiO_2$ thickness. Moreover, by using a single graphene layer, very high electric field confinement was achieved in the slot region, owing to more electrical conductivity shown by single-layer graphene compared to multi-layer graphene.

Figure 5A:
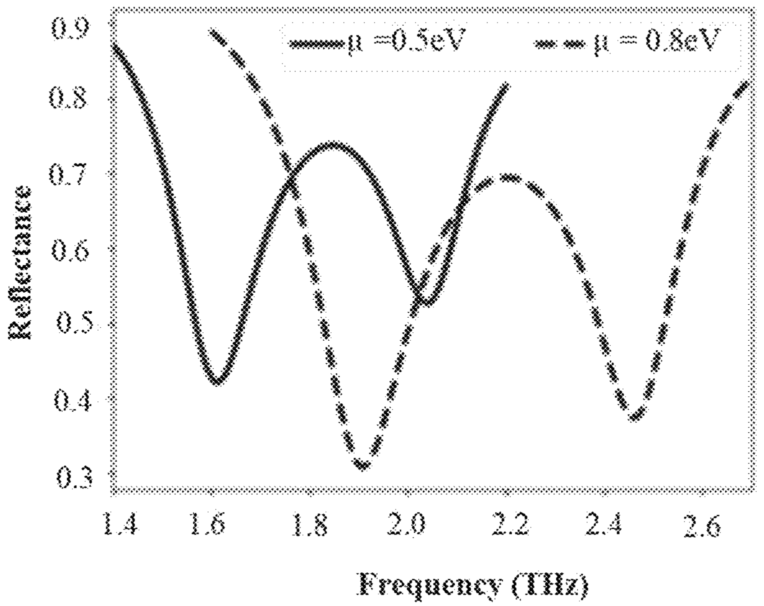
FIG. 5 (FIG. 5A through FIG. 5C) illustrates plots associated with tunability study of the graphene metasurface based tunable linear to circular polarization converter of FIG. 1 according to some embodiments of the present disclosure.
Figure 5B:
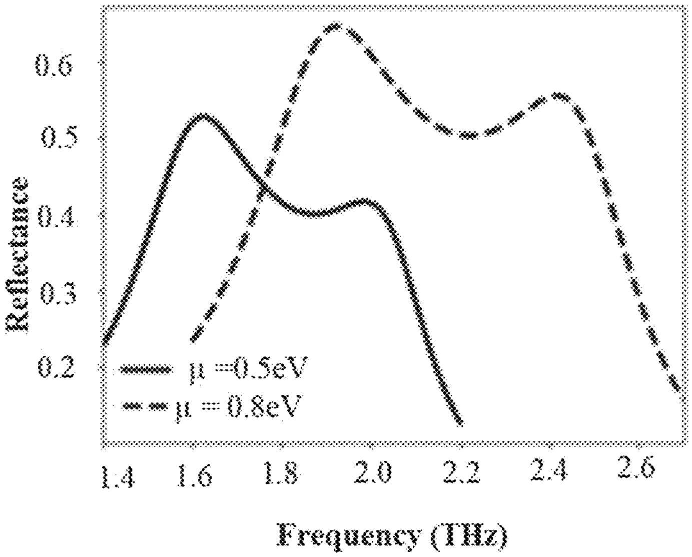
Figure 5C:
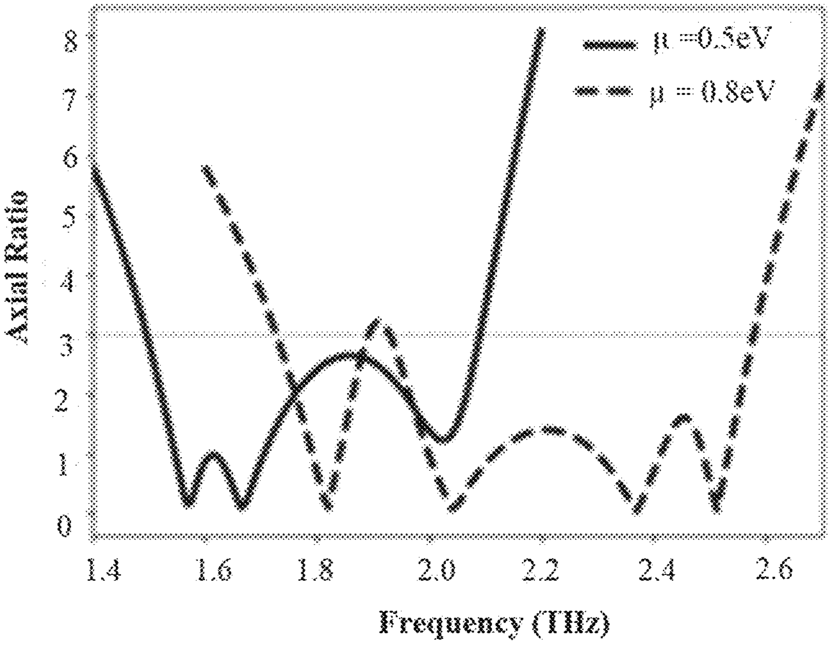

The tunability of the present metasurface structure was studied by simulating the co-polar and cross-polar responses for different values of chemical potential(μ). FIG. 5A illustrates shift obtained in co-polar reflectance by tuning μ from 0.5 eV to 0.8 eV. FIG. 5B illustrates shift obtained in cross-polar reflectance by tuning μ from 0.5 eV to 0.8 eV and FIG. 5C illustrates shift obtained in axial ratio by tuning μ from 0.5 eV to 0.8 eV. It can be clearly observed from FIG. 5C that the bandwidth of the proposed metasurface increases from 600 GHz (1.5 THz-2.1 THz) to 850 GHz (1.75 THz-2.6 THz), as the chemical potential is increased from μ=0.5 eV to μ=0.8 eV.

Figure 6:
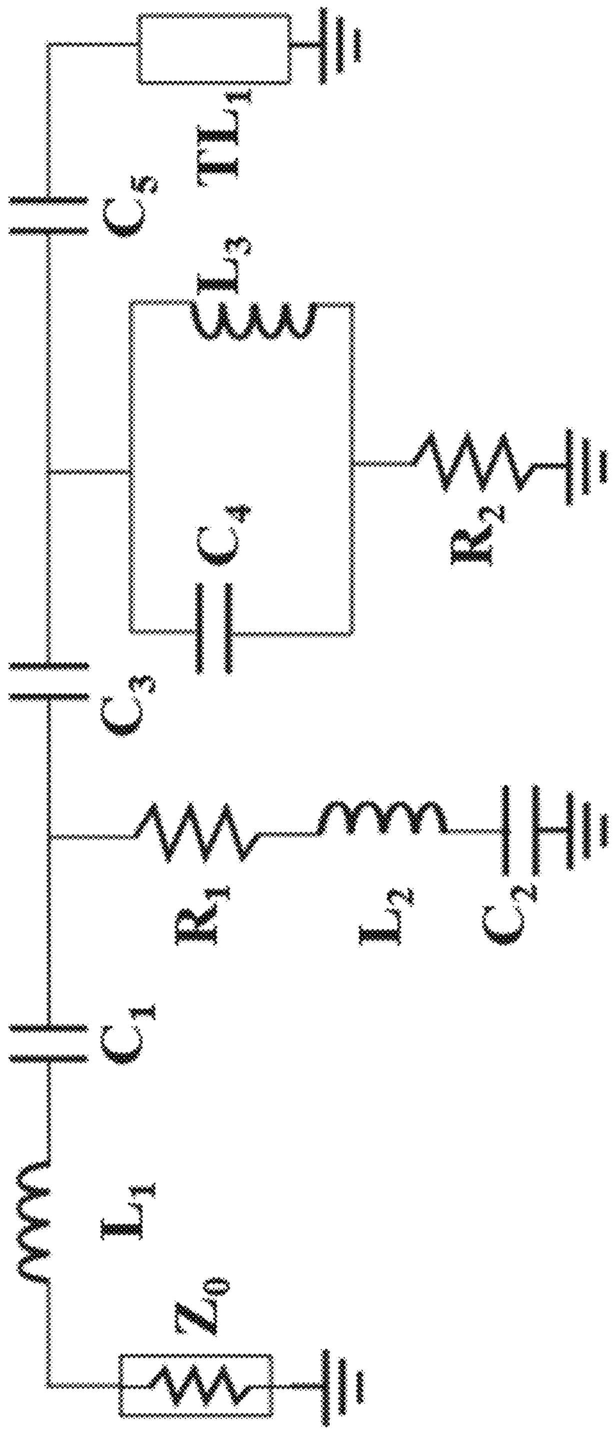
FIG. 6 illustrates an equivalent circuit model for the graphene metasurface according to some embodiments of the present disclosure.
Figure 7:
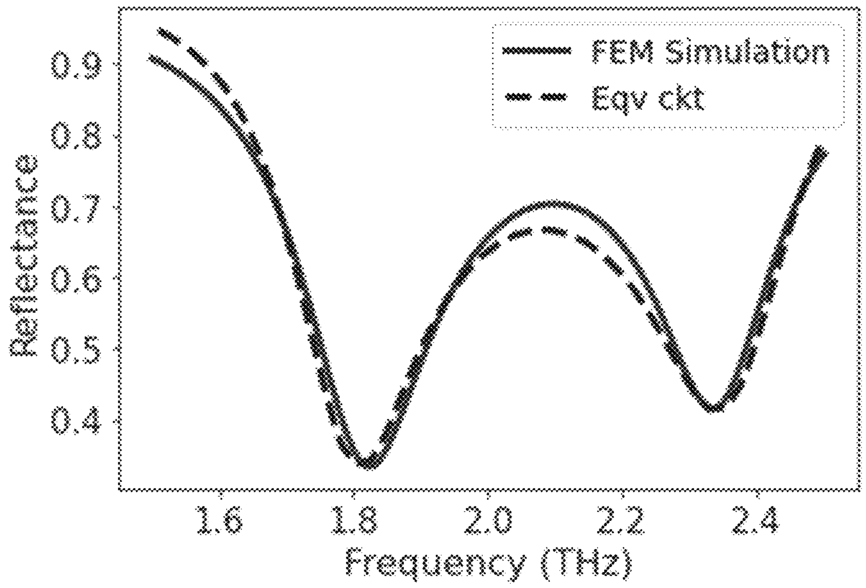
FIG. 7 is a plot comparing simulation output and output from the equivalent circuit model for the graphene metasurface according to some embodiments of the present disclosure.

In an embodiment, the FEM simulation response of the metasurface structure of FIG. 1 has been validated by generating/realizing an equivalent circuit shown in FIG. 6 using the system 300. In an embodiment, the equivalent circuit is generated using an associated circuit realization tool by the system 300. Here, each element of the unit cell is represented by its equivalent electric circuit component (resistor, capacitor, inductor etc.). FIG. 6 shows the equivalent circuit of the unit cell of FIG. 1. Now referring to FIG. 6, the $SiO_2$ substrate is represented by a transmission line stub $TL_1$, which is a function of Z, E and F, where Z is the impedance of the silicon dioxide substrate, E is the phase of the EM wave in degrees and F represents a spectral point in the operating frequency band where the $SiO_2$ substrate interferes with the phase performance of EM wave. As the bottom gold layer does not allow any wave transmission, one end of $TL_1$ is connected to the ground. The top graphene sheet and the bottom gold layer, separated by $SiO_2$ substrate gives rise to the capacitance $C_5$. The circular and linear current on the top graphene region produces an inductive ($L_3$) and capacitive ($C_4$) effect respectively. $L_3$ and $C_4$ is connected together as a parallel LC circuit in series with a resistance ($R_2$), to incorporate any losses. The phi-shaped slot in between $\psi_1$ and $\psi_2$ also forms a capacitance, $C_3$. Also, periodic arrangement of graphene exhibit both inductive and capacitive effects. Hence, the regions $\psi_1$ and $\psi_2$ is represented by ($L_1$, $C_1$) and ($L_2$, $C_2$) respectively, with an additional resistor $R_1$ incorporating the ohmic losses. $Z_0$ is the free space impedance and is equal to 377Ω. The optimized values of the circuit parameters are computed using gradient optimization and is found to be $-L_1$=185.42 pH, $L_2$=19.71 pH, $L_3$=2.31 fH, $R_1$=36.060, $R_2$=0.55 mΩ, $C_1$=0.03fF, $C_2$=4.08fF, $C_3$=0.35fF, $C_4$=594.4fF, $C_5$=22.43fF and $TL_1$(Z,E,F)=(234.5Ω, 46.1°, 2.4 THz). FIG. 7 shows the comparison plot between the $R_{xx}$ plots obtained from FEM simulation and the equivalent circuit of FIG. 6. It is obtained by simulating the reflecting scattering parameter of the circuit of FIG. 6, where the optimal values of circuit components are obtained using gradient optimization algorithm. From FIG. 7, it is evident that the reflectance of the FEM simulation and the equivalent circuit are similar.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of graphene metasurface based tunable linear to circular polarization converter. The present disclosure provides a novel linear-to-circular polarization converter in the THz band consisting of a ϕ-slotted top graphene layer, $SiO_2$ substrate and a bottom gold layer. It gives a tunable broadband response starting from 1.5 THz till around 2.6 THz, depending on the chemical potential value, μ of graphene. The structure is studied by varying μ from 0.5 eV to 0.8 eV, the later giving the maximum bandwidth of 850 GHz. The high bandwidth along with compact size of unit-cell (λ/7), thin configuration (λ/10) and very high electric field confinement in the slot region minimizes the tradeoffs in the existing designs, making it a good choice for THz communication systems. The linear-to-circular polarization converter is validated using an equivalent circuit model, whose response agrees very well with the FEM simulation results.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A graphene metasurface based tunable linear to circular polarization converter comprising:

a graphene metasurface comprising a two dimensional periodic array of a plurality of unit cells along x-axis and y-axis, wherein each of the plurality of unit cells is a three layered stacked structure with a predefined periodicity, wherein the three layered stacked structure comprises a top layer, a middle layer, and a bottom layer, wherein the top layer is a single layer graphene sheet with a slot etched at a predefined angle of about 45 degrees with respect to both the x-axis and the y-axis to divide the single layer graphene sheet into two regions with predefined geometrical dimensions, wherein the predefined geometrical dimensions and the predefined periodicity are selected based on (i) a thickness of the middle dielectric layer and a lattice size corresponding to subwavelength dimensions relative to an operating wavelength, and (ii) multiple reflections between the top graphene layer and the bottom metallic layer produce a controlled phase difference between orthogonal polarization components, wherein the graphene metasurface is configured such that an incident linearly polarized electromagnetic wave induces antiparallel surface currents in the graphene layer and the bottom metallic layer, converts an incident linearly polarized electromagnetic wave into a circularly polarized reflected wave, resulting in a magnetic resonance generating orthogonal field components, wherein a slot geometry and the single layer graphene sheet provide localized electric field confinement within the slot region, wherein the controlled phase difference between orthogonal components is determined by the predefined geometrical dimensions, thickness of the dielectric layer, and interference of reflected waves between the top and bottom layers, wherein the graphene metasurface is configured to reflect back a linearly polarized EM wave incident on the graphene metasurface along a corresponding co-polar and cross-polar components with a predefined phase difference and a predefined axial ratio over a wide frequency range, wherein extent of the circular polarization is measured with the predefined phase difference and the predefined axial ratio over the wide frequency range, when the frequency below the predefined phase difference and the predefined axial ratio, considering the frequency as optimized circularly polarized EM wave, when the frequency above a predefined operating frequency band corresponding to a predefined central frequency band, the linearly polarized EM wave incident induces the current on top layer of graphene sheet as well as at the bottom layer of gold sheet to generate bidirectional magnetic field corresponding the co-polar and cross-polar components based on interference of multiple reflected waves from the top and bottom layer accordance with the geometrical dimensions.

2. The linear to circular polarization converter as claimed in claim 1, wherein the middle layer is a dielectric substrate.

3. The linear to circular polarization converter as claimed in claim 1, wherein the bottom layer comprises a thin layer of gold to prevent any electromagnetic (EM) wave transmission.

4. The linear to circular polarization converter as claimed in claim 1, wherein the linear-to-circular polarization is independent of a polarization state of the incident EM wave.

5. The linear to circular polarization converter as claimed in claim 1, wherein a response of the graphene metasurface is tunable post fabrication, wherein tuning of the response is performed by changing a chemical potential of the graphene metasurface using one of an external voltage and external current.

* * * * *